US010800523B2

(12) United States Patent
Qu et al.

(10) Patent No.: US 10,800,523 B2
(45) Date of Patent: Oct. 13, 2020

(54) PRE-DETERMINING UAV ATTITUDE CHANGES BASED ON COMMANDED COMPONENT MOVEMENTS, AND ASSOCIATED SYSTEMS AND METHODS

(71) Applicant: SZ DJI TECHNOLOGY CO., LTD., Shenzhen (CN)

(72) Inventors: Zongyao Qu, Shenzhen (CN); Hideaki Mita, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 84 days.

(21) Appl. No.: 16/193,902

(22) Filed: Nov. 16, 2018

(65) Prior Publication Data
US 2019/0084675 A1 Mar. 21, 2019

Related U.S. Application Data

(63) Continuation of application No. PCT/CN2016/085738, filed on Jun. 14, 2016.

(51) Int. Cl.
*G05D 1/00* (2006.01)
*B64C 39/02* (2006.01)
(Continued)

(52) U.S. Cl.
CPC ............ *B64C 39/024* (2013.01); *B64D 47/08* (2013.01); *G03B 15/006* (2013.01);
(Continued)

(58) Field of Classification Search
CPC ........ B64C 2201/024; B64C 2201/027; B64C 2201/108; B64C 2201/127; B64C 39/024;
(Continued)

(56) References Cited

U.S. PATENT DOCUMENTS

| | | | |
|---|---|---|---|
| 9,139,310 B1 | 9/2015 | Wang | |
| 2011/0290937 A1* | 12/2011 | Salkeld | G05D 1/0094 244/80 |

(Continued)

FOREIGN PATENT DOCUMENTS

| | | |
|---|---|---|
| CN | 103394199 A | 11/2013 |
| CN | 204592779 U | 8/2015 |

(Continued)

OTHER PUBLICATIONS

The World Intellectual Property Organization (WIPO) International Search Report and Written Opinion for PCT/CN2016/085738 dated Mar. 3, 2017 11 pages.

*Primary Examiner* — Hunter B Lonsberry
*Assistant Examiner* — Matthew J. Reda
(74) *Attorney, Agent, or Firm* — Anova Law Group, PLLC

(57) ABSTRACT

An unmanned aerial vehicle (UAV) apparatus includes an airframe, a propulsion system carried by the airframe and including at least one propulsion device, a movable component carried by the airframe, and a control system. The control system is programmed with instructions that, when executed, cause the control system to receive a first input corresponding to a characteristic of the movable component, receive a second input corresponding to a command to move the movable component, and direct a change in a setting of the at least one propulsion device in response to the first input and the second input.

19 Claims, 6 Drawing Sheets

(51) Int. Cl.
*B64D 47/08* (2006.01)
*G03B 15/00* (2006.01)
*G05D 1/08* (2006.01)

(52) U.S. Cl.
CPC ......... *G05D 1/0094* (2013.01); *G05D 1/0816* (2013.01); *G05D 1/0858* (2013.01); *B64C 2201/024* (2013.01); *B64C 2201/027* (2013.01); *B64C 2201/108* (2013.01); *B64C 2201/127* (2013.01)

(58) Field of Classification Search
CPC .... B64D 47/08; G03B 15/006; G05D 1/0094; G05D 1/0816; G05D 1/0858
See application file for complete search history.

(56) References Cited

U.S. PATENT DOCUMENTS

2014/0055613 A1    2/2014  Ohtomo et al.
2016/0179096 A1*   6/2016  Bradlow ................ B64C 19/00
                                                      701/8

FOREIGN PATENT DOCUMENTS

| CN | 105472252 A | 4/2016 |
| CN | 105473442 A | 4/2016 |
| CN | 205150247 U | 4/2016 |
| JP | H05158540 A | 6/1993 |
| JP | 2009107032 A | 5/2009 |
| JP | 2011239301 A | 11/2011 |
| JP | 201634684 A | 3/2016 |
| JP | 2016101774 A | 6/2016 |

* cited by examiner

PRE-DETERMINING UAV ATTITUDE CHANGES BASED ON COMMANDED COMPONENT MOVEMENTS, AND ASSOCIATED SYSTEMS AND METHODS

CROSS-REFERENCE TO RELATED APPLICATION

This application is a continuation of International Application No. PCT/CN2016/085738, filed on Jun. 14, 2016, the entire contents of which are incorporated herein by reference.

TECHNICAL FIELD

The present technology is directed generally to pre-determining UAV attitude changes based on commanded component movements, and associated systems and methods.

BACKGROUND

Unmanned aerial vehicles (UAVs) can operate autonomously, or under the control of an off-board human controller. Accordingly, UAVs can perform a wide variety of missions that are dangerous, expensive, and/or otherwise objectionable for performance by a manned aircraft. Representative missions include crop surveillance, real estate photography, inspection of buildings and other structures, fire and safety missions, border patrols, and product delivery, among others. A representative mission includes obtaining images via a camera or other image sensor carried by the UAV. A challenge with obtaining such images with a UAV is that, because the UAV is airborne, it can be difficult to stabilize the image under at least some conditions, including conditions during which the UAV undergoes maneuvers. Accordingly, there remains a need for improved techniques and systems for controlling UAVs and the payloads carried by the UAVs.

SUMMARY

The following summary is provided for the convenience of the reader and identifies several representative embodiments of the disclosed technology.

Representative embodiments of the present technology include an unmanned aerial vehicle (UAV) apparatus, comprising an airframe and a propulsion system carried by the airframe and having at least one propulsion device. The apparatus further includes a movable component carried by the airframe, and a control system. The control system is programmed with instructions that, when executed, receive a first input corresponding to a characteristic of the movable component, receive a second input corresponding to a command to move the movable component, and, in response to the first and second inputs, direct a change in a setting of the at least one propulsion device.

In particular embodiments, the movable component includes at least a portion of a camera carried by the airframe, for example, a lens of the camera. In any of the foregoing embodiments, the movable component can include at least a portion of a gimbal carried by the airframe, or a portion of a camera carried by the gimbal. The propulsion device can include a motor-driven propeller in particular embodiments, and the setting of the propulsion device can include a speed setting of the motor, or an orientation of a motor-driven propeller. The motor-driven propeller can be one of a plurality of motor-driven propellers carried by the airframe. The characteristic of the movable component can include a weight of the component, an initial position of the component, or both.

In a further particular embodiment, the propulsion device includes at least one motor-driven propeller, the movable component includes a movable camera lens, and the first input includes a weight of the camera lens and an initial location of the camera lens. The second input includes a target location for the camera lens and at least one of the first and second inputs includes a target speed for moving the camera lens. The instructions, when executed, receive a further input corresponding to an initial attitude of the airframe, and determine an estimated subsequent location of the camera lens, based on the initial location, the target location, and the target speed. The instructions also determine an estimated change in an attitude of the airframe based at least in part on the estimated subsequent location of the camera lens and the weight of the camera lens. In response to the first and second inputs, the instructions direct a change in a speed of the at least one motor-driven propeller to position the airframe in the initial attitude, or maintain the airframe in the initial attitude, or both. In still a further particular embodiment, the change in speed of the propeller is directed before a movement of the lens in response to the command to move the movable component is sensed on board the airframe.

In yet further embodiments, a further input can include an input corresponding to a detected deviation from the initial attitude, and the instructions, when executed, can direct the change in the setting of the at least one propulsion device (e.g., the speed of a motor-driven propeller) in response to the further input.

Further embodiments of the present technology are directed to a method for configuring a control system for a UAV, and include programming a computer-readable medium with instructions that, when executed, receive a first input corresponding to a characteristic of a movable component carried by the UAV, receive a second input corresponding to a command to move the movable component, and, in response to the first and second inputs, direct a change in a rotational speed of a propeller carried by the UAV. Further aspects of the method for configuring the controller can include any one or a combination of the elements described above.

Still further embodiments of the present technology include computer-implemented methods for flying a UAV, including receiving a first input corresponding to a characteristic of a movable component carried by the UAV, receiving a second input corresponding to a command to move the movable component, and, in response to the first and second inputs, directing a change in a rotational speed of a propeller carried by the UAV. Such methods can include any one or a combination of any of the foregoing elements described above.

DETAILED DESCRIPTION

1. Overview

Figure 1:
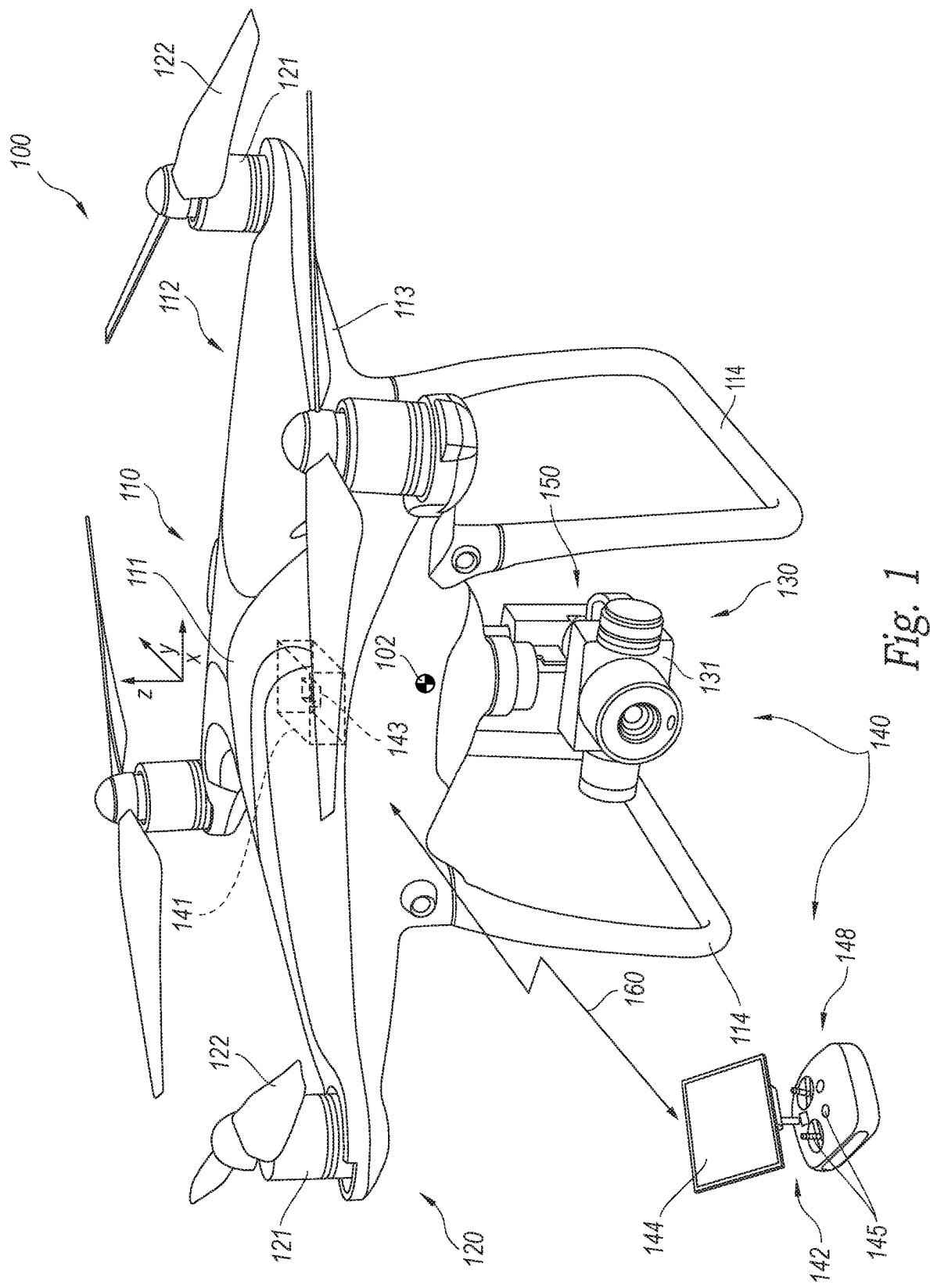
FIG. 1 is a schematic illustration of a UAV having a control system configured to pre-determine attitude changes of the UAV resulting from commanded movements of one or more UAV components, and account for such attitude changes, in accordance with representative embodiments of the present technology.

The present technology is directed generally to predetermining unmanned aerial vehicle (UAV) attitude changes based on commanded component movements, and associated systems and methods. In particular embodiments, components on board the UAV are deliberately moved to perform the missions carried out by the UAV. For example, in a UAV that performs an imaging function, a camera or other imaging device is typically moved via a gimbal so as to direct the field of view of the imaging device to an area of interest. In addition, one or more lenses of the imaging device are moved to focus the image and to zoom in on particular features within the field of view. These movements can cause the centers of gravity of the moving components to shift. As a result, the center of gravity of the UAV itself shifts, and the UAV control system must respond to such shifts to prevent or reduce the effects of the shifts on the quality, stability, or both, of the images produced by the imaging device.

Unlike conventional systems, aspects of the present technology are directed to anticipating the effect(s) of such commanded moves on the UAV center of gravity, and directing compensatory changes (e.g., by changing the relative thrust of different propellers carried by the UAV) before the effects of such changes are sensed on board the UAV. Accordingly, this approach can reduce or eliminate the time required to compensate for changes in the attitude of the UAV resulting from the motion of components such as (but not limited to) lenses and gimbals.

Certain details describing structures or processes that are well-known and often associated with UAVs and corresponding systems and subsystems, but that may unnecessarily obscure some significant aspects of the disclosed technology, are not set forth in the following description for purposes of clarity. Moreover, although the following disclosure sets forth several embodiments of different aspects of the technology, several other embodiments can have different configurations or different components than those described in this section. Accordingly, the technology may have other embodiments with additional elements or without several of the elements described below with reference to FIGS. 1-5.

FIGS. 1-5 are provided to illustrate representative embodiments of the disclosed technology. Unless provided for otherwise, the drawings are not intended to limit the scope of the claims in the present application.

Many embodiments of the technology described below may take the form of computer- or controller-executable instructions, including routines executed by a programmable computer or controller. Those skilled in the relevant art will appreciate that the technology can be practiced on computer or controller systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers and the like). Information handled by these computers and controllers can be presented at any suitable display medium, including a CRT display or LCD. Instructions for performing computer- or controller-executable tasks can be stored in or on any suitable computer-readable medium, including hardware, firmware or a combination of hardware and firmware. Instructions can be contained in any suitable memory device, including, for example, a flash drive, USB device, and/or other suitable medium.

2. Representative Embodiments

FIG. 1 is a schematic illustration of a representative UAV 100 configured in accordance with embodiments of the present technology. The UAV 100 can include an airframe 110 that can in turn include a central portion 111 and one or more outer portions 112. In a representative embodiment shown in FIG. 1, the airframe 110 includes four outer portions 112 (e.g., arms 113) that are spaced apart from each other as they extend away from the central portion 111. In other embodiments, the airframe 110 can include other numbers of outer portions 112. In any of these embodiments, individual outer portions 112 can support components of a propulsion system 120 that drives the UAV 100. For example, individual arms 113 can support corresponding individual motors 121 that drive corresponding propellers 122. The motors 121 and propellers 122 can be controlled to account for changes in the center of gravity 102 of the UAV, as will be described in further detail later.

The airframe 110 can carry a payload 130, for example, an imaging device 131. In particular embodiments, the imaging device 131 can include a camera, for example, a camera configured to capture video data, still data, or both. The camera can be sensitive to wavelengths in any of a variety of suitable wavelength bands, including visual, ultraviolet, infrared or combinations thereof. In still further embodiments, the payload 130 can include other types of sensors, other types of cargo (e.g., packages or other deliverables), or both. In many of these embodiments, the payload 130 is supported relative to the airframe 110 with a gimbal 150 that allows the payload 130 to be independently positioned relative to the airframe 110. Accordingly, for example when the payload 130 includes the imaging device 131, the imaging device 131 can be moved relative to the airframe 110 to track a target. When the UAV 100 is not in flight, landing gear 114 can support the UAV 100 in a position that protects the payload 130, as shown in FIG. 1.

In a representative embodiment, the UAV 100 includes a control system 140 having some components carried on board the UAV 100 and some components positioned off the UAV 100. For example, the control system 140 can include a first controller 141 carried by the UAV 100, and a second controller 142 (e.g., a human-operated, ground-based controller) positioned remote from the UAV 100 and connected to the first controller 141 via a communication link 160 (e.g., a wireless link). The first controller 141 can include an on-board computer-readable medium 143a that executes instructions directing the actions of the UAV 100, including, but not limited to, operation of the propulsion system 120 and the imaging device 131. The second controller 142 can include an off-board computer-readable medium 143b, and one or more input/output devices 148, e.g., a display 144 and control devices 145. The operator manipulates the control devices 145 to control the UAV 100 remotely, and receives feedback from the UAV 100 via the display 144 and/or other devices. In other representative embodiments, the UAV 100 can operate autonomously, in which case the second controller 142 can be eliminated, or can be used solely for operator override functions. The on-board computer-readable medium 143a can be removable from the UAV 100. The off-board computer-readable medium 143b can be removable from the second controller 142, e.g., separable from the one or more input/output devices 148.

The UAV 100 can include several movable components 101, including, but not limited to, the gimbal 150, the imaging device 131, and individual elements of these devices. When these components move, the UAV center of gravity 102 also moves in ways that may be subtle, but still have an impact on the UAV 100. For example, such movements can disturb the stability of the UAV 100 and therefore the stability of the images or other data obtained by the UAV 100, as described in further detail below.

Figure 2:
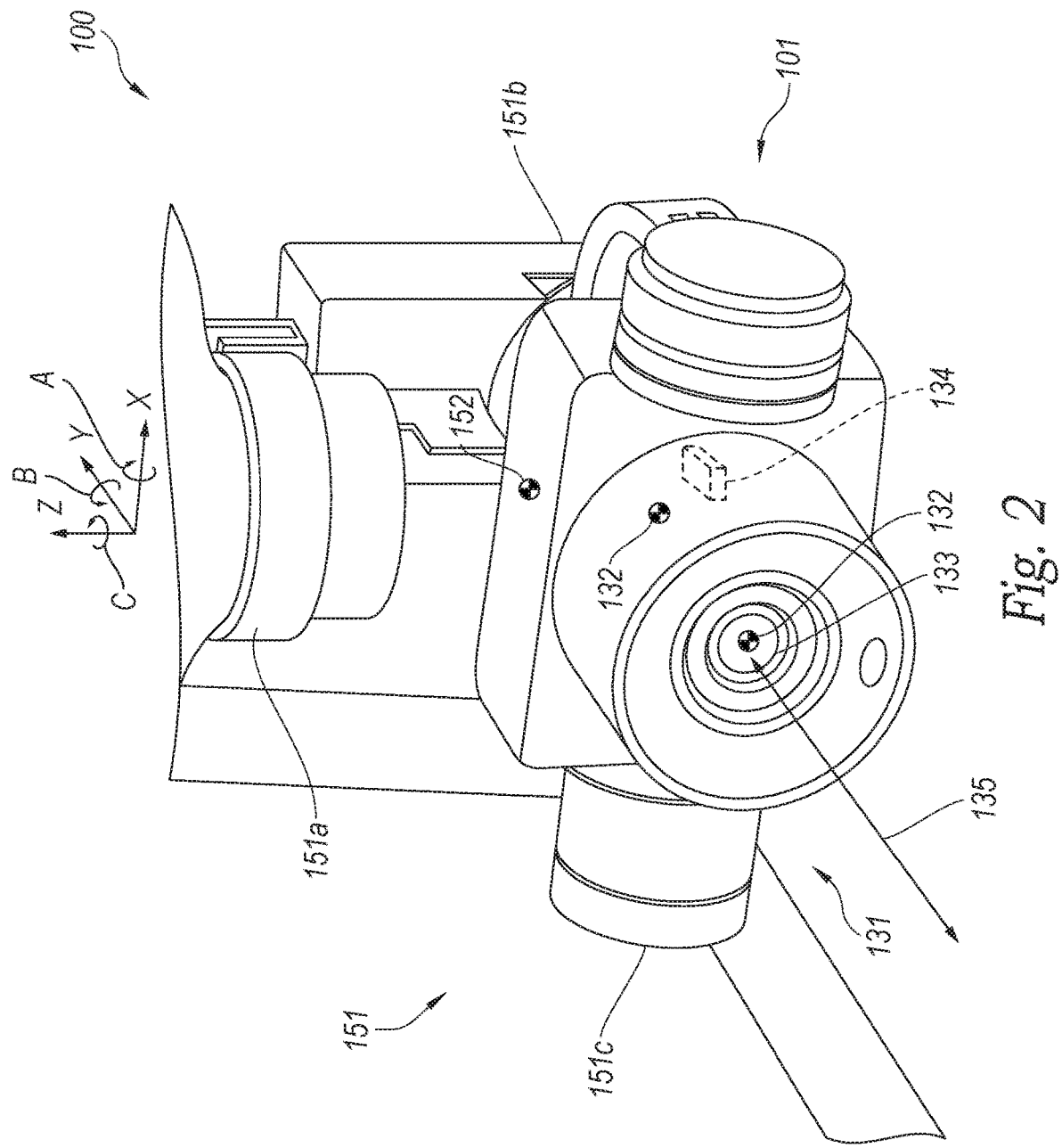
FIG. 2 is an enlarged illustration of a portion of the UAV shown in FIG. 1, including a representative gimbal and imaging device, configured to operate in accordance with representative embodiments of the present technology.

FIG. 2 is a schematic, enlarged illustration of a portion of the UAV 100 shown in FIG. 1, illustrating further details of the gimbal 150 and the imaging device 131. The imaging device 131 can include one or more lenses 133 (one of which is visible in FIG. 2) that move along one or more corresponding lens motion axes 135. Each lens 133 has a lens center of gravity 132 that moves along the lens motion axis 135 as the lens moves. A lens actuator 134 (shown schematically in FIG. 2) drives the lens 133 along the lens motion axis 135. During typical operations, the lens 133 is commanded to move, thus providing functions including, but not limited to, focusing, de-focusing, zooming in, and zooming out.

The imaging device 131 has a corresponding imaging device center of gravity 132 that moves when the gimbal 150 (which supports the imaging device 131) moves. In particular, the gimbal 150 can rotate the imaging device 131 about an x axis (e.g., a pitch axis), as indicated by arrow A, a y axis (e.g., a roll axis), as indicated by arrow B, and a z axis (e.g., a yaw axis), as indicated by arrow C. The foregoing motions can be provided by corresponding gimbal actuators 151, identified individually as a first gimbal actuator 151a (that provides motion about the z axis), a second gimbal actuator 151b (that provides motion about the y axis), and a third gimbal actuator 151c (that provides motion about the x axis). As the imaging device 131 moves relative to the foregoing axes, the imaging device center of gravity 132 typically also moves. Furthermore, the gimbal 150 itself has a gimbal center of gravity 152 that, for at least some motions, moves when the gimbal 150 is commanded to position the imaging device 131 at a particular location, orientation, or both.

As a result of the motions undertaken by any one or more of the movable components 101 carried by the UAV 100, the UAV center of gravity 102 (shown in FIG. 1) will also move. The processes described further below can reduce or eliminate the impact of this motion on the attitude of the UAV 100, and therefore on the quality of the data collected by the imaging device 131.

Figure 3A:
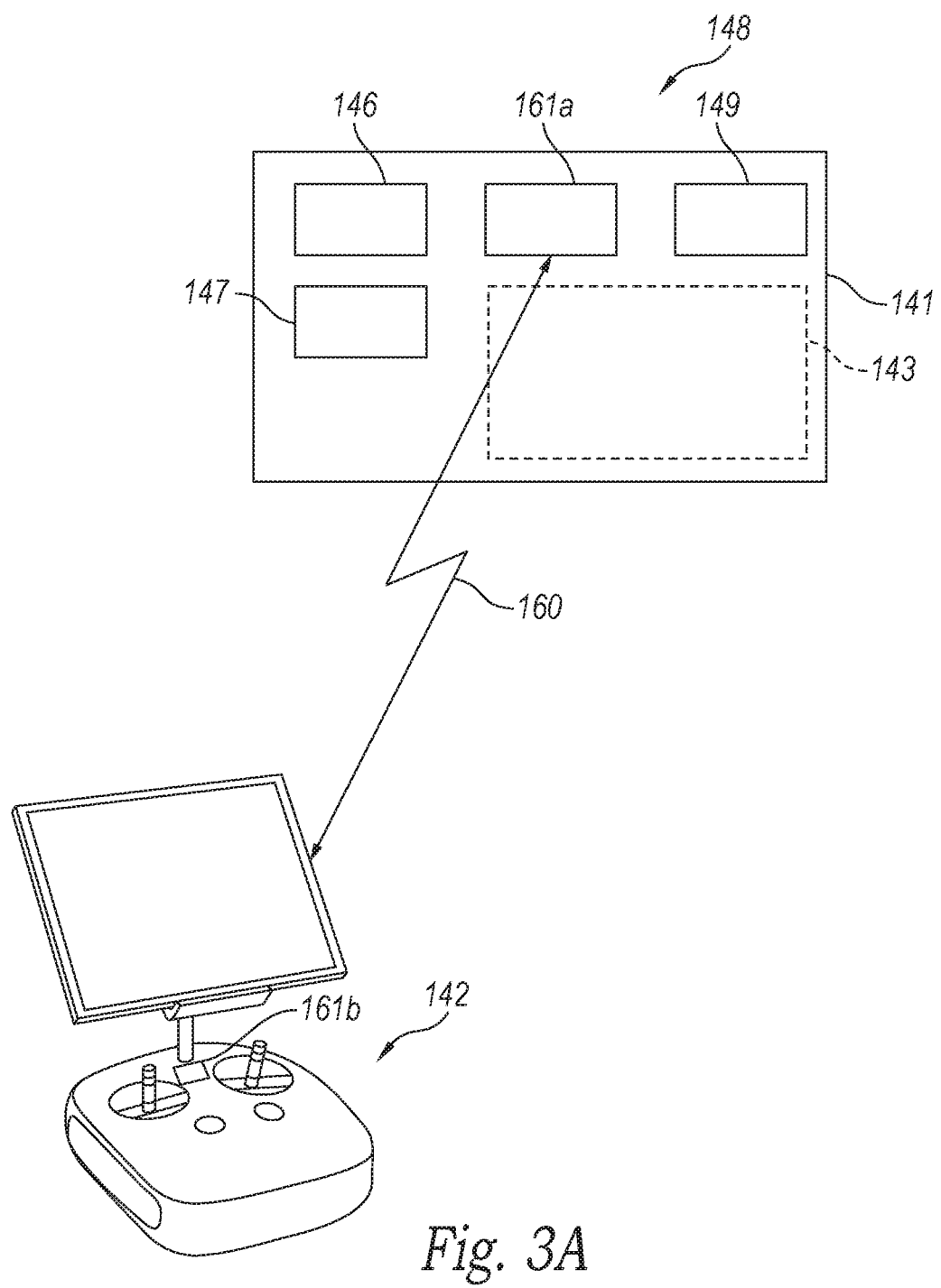
FIG. 3A is a schematic illustration of a control system including a first controller carried on board a UAV and configured to control the UAV in accordance with representative embodiments of the present technology.

FIG. 3A is a schematic illustration of the first controller 141, which can include a processor 146, memory 147, and input/output devices 148. A control unit 149 directs the operation of the various components of the UAV 100, including the propulsion system 120 described above. A computer-readable medium 143 (which can be housed in, or include elements of, any of the foregoing components) contains instructions that, when executed, direct the behavior of the propulsion system 120 and other UAV systems. A first communication device 161a is configured to provide wireless communication with a corresponding second communication device 161b carried by the second controller 142, via the communication link 152.

Figure 3B:
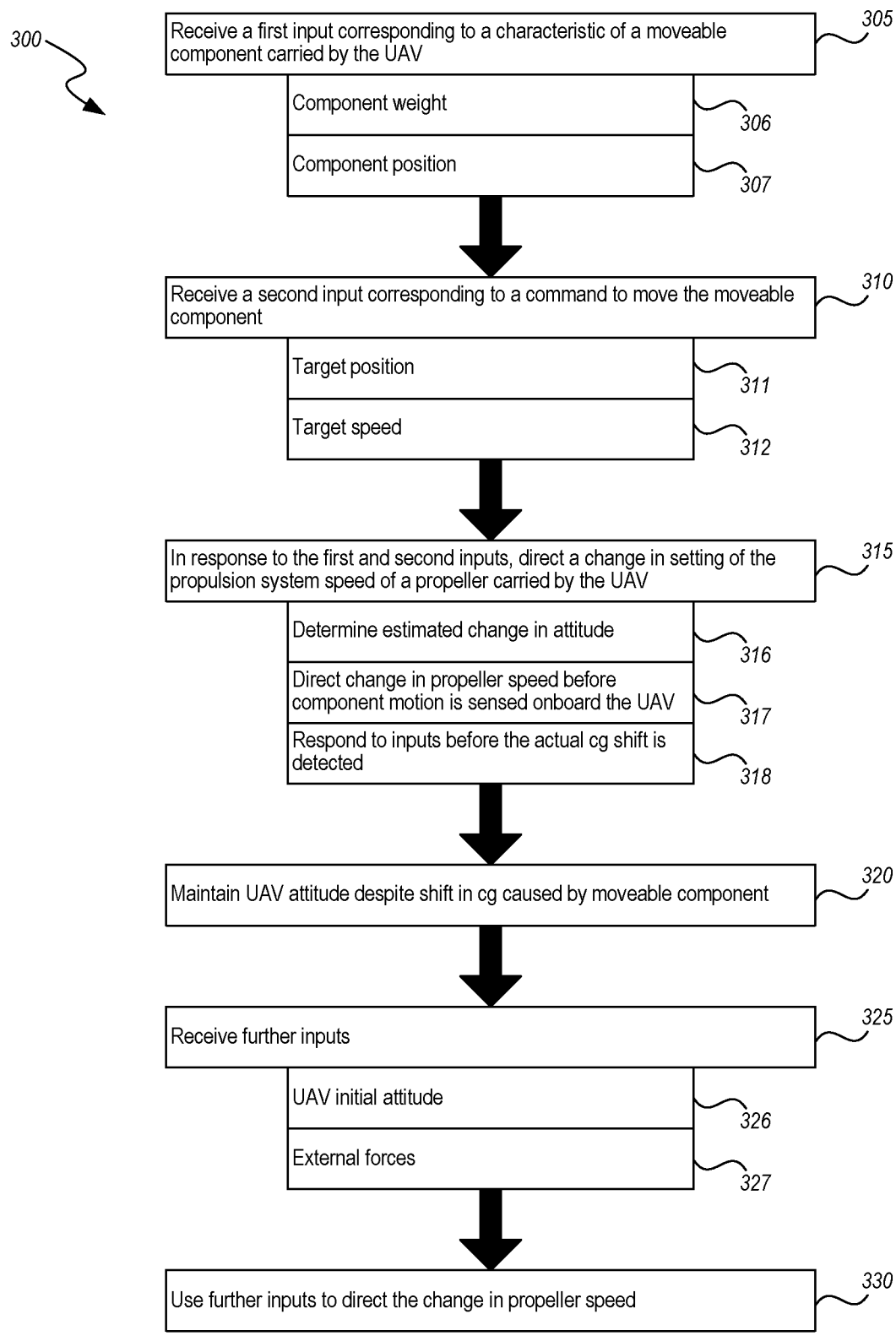
FIG. 3B is a flow diagram illustrating a process for controlling a UAV in accordance with an embodiment of the present technology.

FIG. 3B is a flow diagram illustrating a process 300 for controlling a UAV in accordance with representative embodiments of the present technology. Block 305 includes receiving a first input corresponding to one or more characteristics of a movable component carried by the UAV. As discussed above, the movable component can include one or more lenses of an imaging device (e.g., a camera), the imaging device itself, a gimbal or other support apparatus carrying the imaging device or any combination of the foregoing elements. In further embodiments, the movable component can include another device, in addition to or in lieu of the foregoing devices or elements. The one or more characteristics of the movable component can include the component weight (block 306), the component position (block 307), or both. Elements of the data corresponding to the first input can be fixed (e.g., the weight of the lens) or variable (e.g., the position of the lens). Variable data can be obtained via one or more suitable sensors, e.g., motion detectors, transducers, or other devices. When the movable component includes the imaging device, the gimbal, or other elements, the first input can include suitable weights and positions for those elements. The weights and positions are then used to determine the position of a center of gravity for the component(s) and/or changes in the position of the component center of gravity. The position of the center of gravity can be stored in the computer-readable medium of the UAV 100 or the second controller in advance of operating the UAV 100.

Block 310 includes receiving a second input corresponding to a command to move the movable component. For example, the command can include a command to change the focus, the zoom level, or both, of the imaging device, which in turn corresponds to a command to move one more lenses of the imaging device. The command can include a target position for the movable component (block 311), a target speed with which the position is to be achieved (block 312), a target direction for the motion, or any combination of the foregoing data. Again, some elements of the data corresponding to the second input may be fixed, and others may be variable. For example, the target position will typically vary from one command to another. The target speed may be the same for all commands, or may be variable. For example, the target speed may be higher for large commanded motions than for small commanded motions. As a particular example, the gimbal may move at a faster rate when it is commanded to rotate 120° than when it is commanded to rotate 5°. When the movable component includes the imaging device, the gimbal, or other elements, the second input can include corresponding suitable target positions (e.g., angular positions) and target speeds (e.g., angular rotation rates).

Block 315 includes responding to the first and second inputs by directing a change in a setting of the propulsion system, e.g., at least one propulsion device carried by the UAV. For example, the change can include a change in the rotational speed of one or more propellers carried by the UAV. In other embodiments, the change can be a change in the orientation of the propellers. For example, if the motors and/or propellers tilt or otherwise change orientation relative to the airframe, the change can include a change in that orientation. In general, the purpose of changing the setting of the propulsion device is to account for an expected change in the center of gravity of the UAV, caused by the movement of the movable component. Accordingly, the process can include determining an estimated change in the attitude of the UAV (block 316). The process can also include directing the change in propeller speed (or other setting of the at least one propulsion device) before the motion undergone by the component is sensed onboard the UAV (block 317). The process can also include responding to the inputs, including the commands directed to the movable component, before the actual center of gravity shift of the components, the UAV, or both, are detected (block 318).

Embodiments of the foregoing process are different than the process typically used in conventional UAV control systems. Such conventional processes rely on detecting a change in attitude of the UAV resulting from the motion of components onboard the UAV, and then responding by correcting the change in attitude. Embodiments of the processes described herein effectively anticipate the change in attitude, and make one or more corrections to account for the effects of the commanded motion of the component in parallel with the motion itself. As a result, it is expected that the deviation in attitude experienced by the UAV as a result of the commanded motion will be reduced, compared to a process of responding to a change in attitude only after the attitude change has occurred and has been detected.

One result, as shown in block 320, is that the UAV attitude can be maintained despite the shift in center of gravity caused by the movable component. For example, as described below, the propulsion system can be used to control the UAV attitude to remain the same, or to deviate only slightly, from an initial or pre-movement attitude. In particular embodiments, the process can include maintaining the UAV in a horizontal attitude, or in a selected attitude relative to horizontal, and in other embodiments, the UAV can be maintained in other attitudes.

In block 325, the process includes receiving further inputs. Such inputs can include the initial or pre-movement attitude of the UAV (block 326). This input can be used as a baseline against which to control the attitude of the UAV, and minimize (or at least reduce) deviations from the initial attitude, which would otherwise result from the commanded motion. Accordingly, the process can include causing the airframe to maintain, move toward, or both maintain and move toward (e.g., at different times) the pre-movement attitude. The pre-movement attitude can be identified relative to any one or combination of the x, y, z axes (FIG. 2), or relative to other environmental markers (e.g., the horizon, or another horizontal reference). Still further inputs can include inputs due to external forces (block 327) on the UAV (e.g., on the UAV airframe). For example, the UAV may undergo attitude changes due to forces other than the movement of the movable component, such as forces due to changes in wind speed and/or direction. In block 320, the further inputs are used in addition to the first and second inputs to change the speed of the propeller, or other propulsion system setting.

Figure 4:
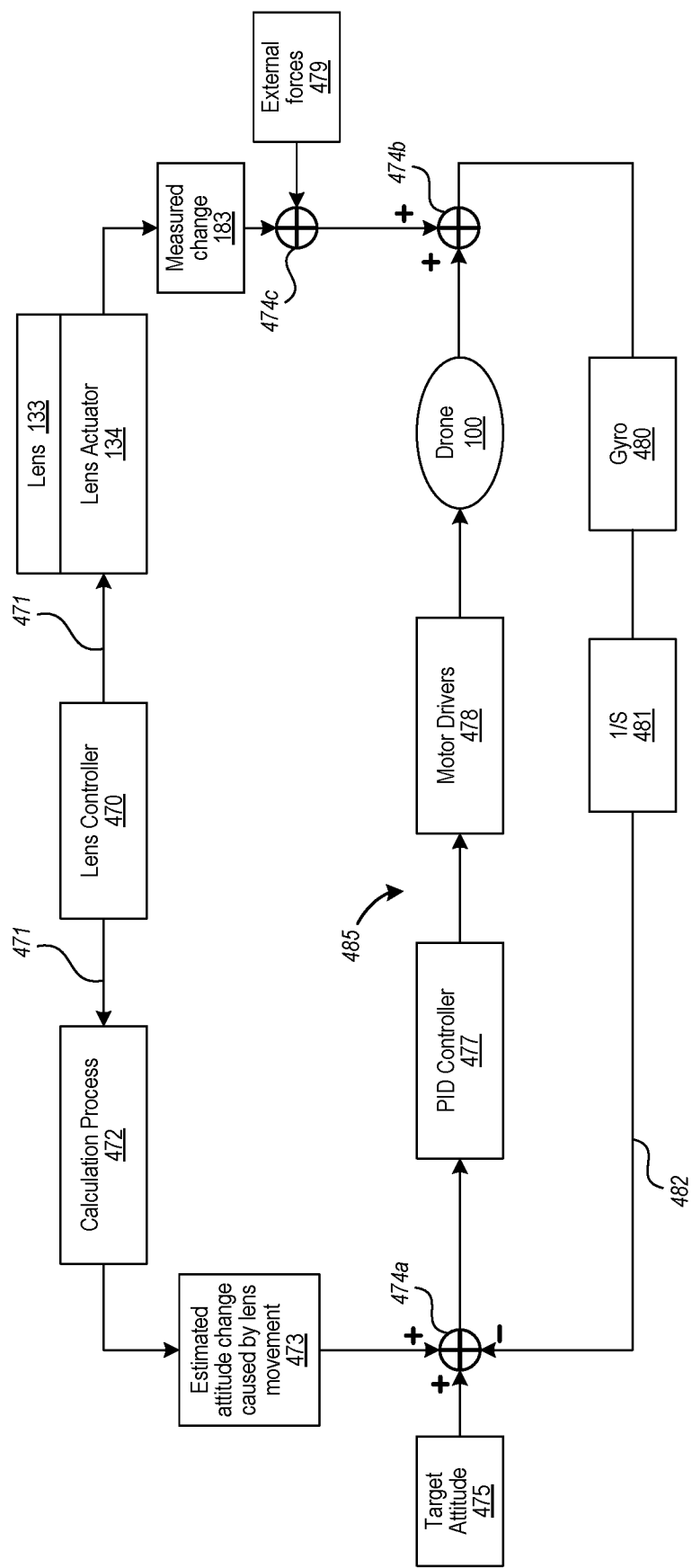
FIG. 4 is a schematic illustration of a controller-implemented feedback loop for controlling a UAV in accordance with embodiments of the present technology.

FIG. 4 is a block diagram illustrating a control scheme for executing the process described above with reference to FIG. 3B, in accordance with a representative embodiment of the present technology. The process is described in the context of lens movement for purposes of illustration, and can be applied more generally to other movable components (e.g., the imaging device, gimbal, or both). A lens controller 470 (e.g., a component of the overall control system 140 described above), can issue a lens movement command 471 which is directed to the lens 133 (or more particularly, the lens actuator 134). Information from the lens movement command 471, or the lens movement command 471 itself, can also be directed as an input to a calculation process 472. The calculation process 472, a particular embodiment of which will be described later with reference to FIG. 5, determines an estimated attitude change 473 caused by the lens movement.

The control scheme receives a target attitude 475, for example, a command from the operator to attain or maintain a particular attitude. The target attitude 475 is summed with the estimated change in attitude 473 and a feedback input 482 at a first summation node 474a, which represents the entry point to the main control loop 485 for controlling the attitude of the UAV. The results are directed to a PID controller 477 which issues commands to motor drivers 478 (e.g., drivers for the motors 121 shown in FIG. 1) to change the attitude of the drone 100. The attitude of the drone 100 is an input to a second summation node 474b, which also receives input from external forces such as the wind 479, and actual measured information (e.g., a measured change in the lens center of gravity) resulting from the movement of the lens via a third summation node 474c. The resulting output attitude angle 474 is directed to a gyro 480, which provides output to a transfer function 481, which in turn provides the feedback input 482 to the first summation node 474a. Accordingly, the control loop uses calculated information determined via the calculation process 472 to change the attitude of the UAV in anticipation of a center of gravity shift caused by a moving component, and combines that information with actual measured data in a feedback loop to expedite the process of directing the UAV to its target attitude.

Figure 5:
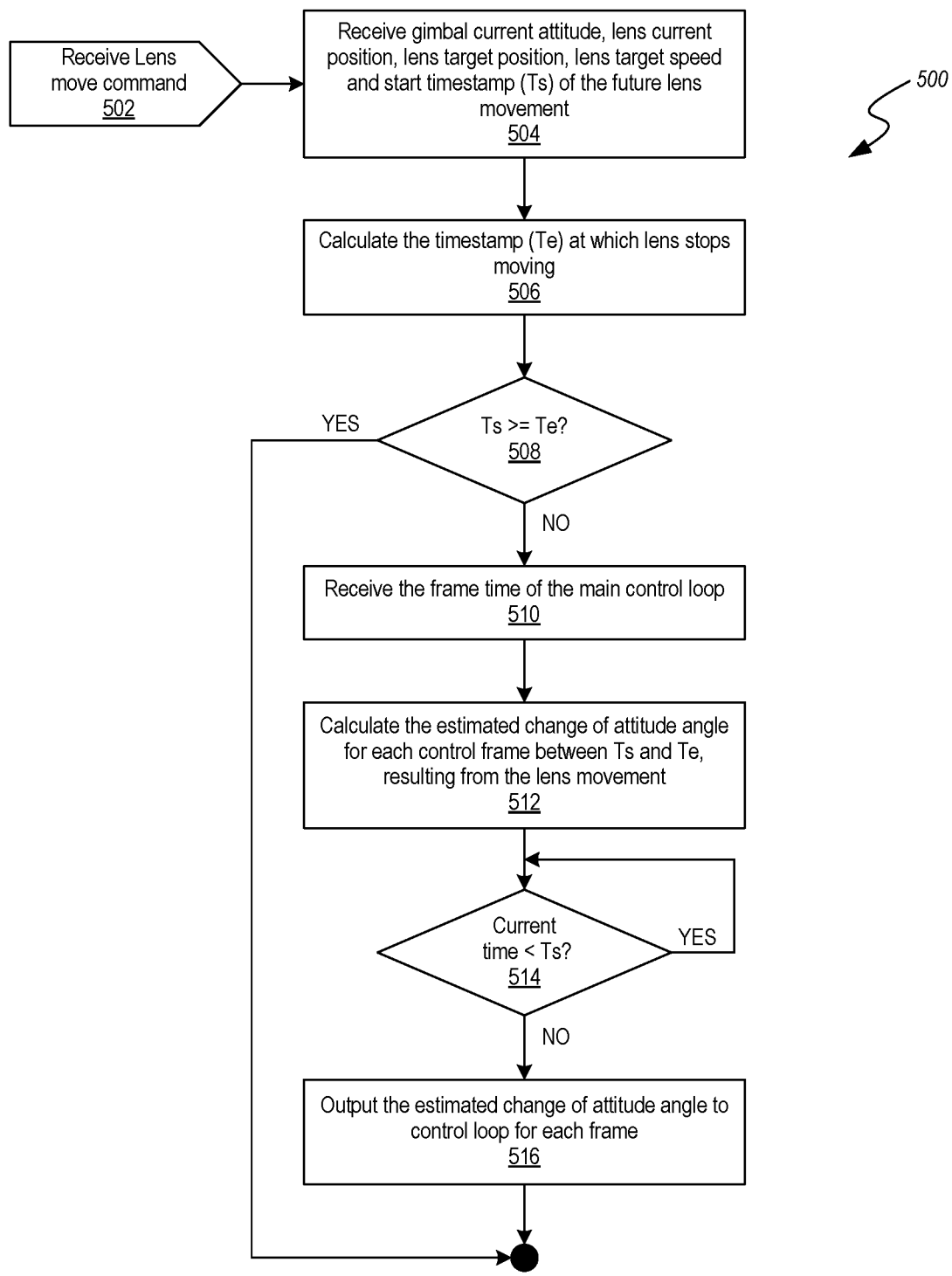
FIG. 5 is a flow diagram illustrating a process for implementing an attitude control function in accordance with representative embodiments of the present technology.

FIG. 5 illustrates a representative flow diagram 500 for executing the calculation process 472 described above with reference to FIG. 4. The process is described in the context of a moving lens. Suitably similar or identical processes can be used for other movable components in other embodiments. Block 502 includes receiving a lens movement command. Block 504 includes receiving a gimbal current attitude, lens current position, target position for the lens, target speed for the lens, and a start time stamp (Ts) corresponding to the time at which the lens movement will be initiated. At block 506, the process includes calculating an end time stamp (Te) at which the lens will stop moving. The end time stamp Te is determined based on the current position, target position, and target speed of the lens.

At block 508, the process determines whether the current time stamp Ts is greater than the end time stamp Te. If it is, then the motion has been completed before the process can actively anticipate it, and the process ends. If not, the process includes determining the frame time of the main control loop 485 (FIG. 4) used to control the UAV attitude.

Block 512 includes calculating an estimated change in attitude angle for each control frame between the start time Ts and the end time Te resulting from the lens movement. For example, if the main control loop 485 operates at 500 Hz and the duration of the lens movement is 0.5 seconds, the process includes determining the attitude change angle for 250 frames. In block 514, the process determines whether the current time is less than the start time Ts. If it is, the process loops until the start time is reached. Once the start time Ts is reached, the process includes outputting the estimated (e.g., calculated) change in attitude angle to the main control loop 485 for each frame of the main control loop (e.g., on a frame-by-frame basis). Once the end time Te has been reached, the process ends and awaits a new input corresponding to a new lens movement command.

One feature of several of the embodiments described above is that rather than simply measuring the effect of a change in the center of gravity of the UAV resulting from the motion of a component on the UAV, the process actively determines what the change in center of gravity will be, and updates the aircraft attitude based on this calculation. As shown in the Figures, this approach can be supplemented by an actual measurement of the aircraft attitude. But by changing the attitude in parallel with the center of gravity change, rather than purely in response to a center of gravity change (or attitude change) that has already occurred, the extent to which the UAV attitude deviates from the target attitude can be reduced or eliminated.

From the foregoing, it will be appreciated that specific embodiments of the technology have been described herein for purposes of illustration, but that various modifications may be made without deviating from the technology. For example, particular embodiments were described above in the context of movable cameras, camera lenses, gimbals, or any combination of the foregoing elements. In other embodiments, the movable component can include other movable elements carried by the UAV. In general, such movable elements do not include the propellers themselves, because the movement of the propellers typically does not change the center of gravity of the UAV. However, in particular embodiments, for example, embodiments for which the center of gravity of the propeller shifts during maneuvers (e.g., if the propeller tilts), then the movable component can include the propeller. Particular embodiments described above include weight (alone or in combination with other component data) as a component characteristic upon which further determinations are made. In other embodiments, the component characteristic(s) can include other information.

In particular embodiments, the inputs received by the computer-readable medium, which provide a basis for the instructions executed by the computer-readable medium, were described in the context of first and second inputs. Such inputs need not be received separately, and in particular embodiments, can be received together as part of a single communication. Accordingly, the form in which the inputs are received can vary from one embodiment to another.

Particular embodiments were described above in the context of a propulsion system that includes multiple, motor-driven propellers. In other embodiments, the propulsion system can include other devices that propel the UAV and position the UAV in a particular attitude. For embodiments that include one or more motor-driven propellers, such embodiments can include four motor-driven propellers, as shown in FIG. 1, or other numbers of motor-driven propellers in other embodiments. In still further embodiments, the UAV can have overall configurations other than those specifically shown or described herein.

Particular embodiments of the process for accounting for or accommodating an anticipated change in the CG location of the UAV, based upon a command to move a movable component, were described above in the context of FIGS. 3B-5. In other embodiments, the processes can be performed in accordance with instructions or method steps performed in accordance with other sequences, or via control loops having other characteristics, or both.

Certain aspects of the technology described in the context of particular embodiments may be combined or eliminated in other embodiments. For example, some embodiments include accounting for the movement of a particular component (e.g., a camera lens). In other embodiments, the techniques can include accounting for changes in the center of gravity location for multiple components (e.g., a camera lens, the camera carrying the camera lens, and the gimbal carrying the camera). In some embodiments, certain values can be stored in memory, with the same value used over and over again for each execution of the process. In other embodiments, such values may be re-received each time the process is executed.

Further, while advantages associated with certain embodiments of the technology have been described in the context of those embodiments, other embodiments may also exhibit such advantages, and not all embodiments need necessarily exhibit such advantages to fall with within the scope of the present technology. Accordingly, the present disclosure and associated technology can encompass other embodiments not expressly shown or described herein.

To the extent any materials incorporated herein conflict with the present disclosure, the present disclosure controls.

At least a portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

We claim:

1. An unmanned aerial vehicle (UAV) apparatus, comprising:
    an airframe;
    a propulsion system carried by the airframe and including at least one propulsion device;
    a movable component carried by the airframe; and
    a control system programmed with instructions that, when executed, cause the control system to:
        receive a first input corresponding to a characteristic of the movable component;
        receive a second input corresponding to a command to move the movable component;
        in response to the first input and the second input, direct a change in a setting of the at least one propulsion device;
        receive a third input corresponding to an actual change in a center of gravity of the movable component, and direct the change in the setting of the at least one propulsion device based at least in part on the third input.

2. The apparatus of claim 1, wherein the movable component includes at least a portion of a camera carried by the airframe.

3. The apparatus of claim 2, wherein the movable component includes a lens of the camera.

4. The apparatus of claim 1, wherein the movable component includes at least a portion of a gimbal carried by the airframe.

5. The apparatus of claim 1, wherein the movable component includes at least a portion of a camera carried by a gimbal, and wherein the gimbal is carried by the airframe.

6. The apparatus of claim 1, wherein the at least one propulsion device includes a motor-driven propeller driven by a motor.

7. The apparatus of claim 6, wherein the setting includes a speed setting of the motor.

8. The apparatus of claim 6, wherein the setting includes an orientation of the motor-driven propeller.

9. The apparatus of claim 6, wherein the motor-driven propeller is one of a plurality of motor-driven propellers carried by the airframe.

10. The apparatus of claim 1, wherein the characteristic of the movable component includes a weight of the movable component.

11. The apparatus of claim 1, wherein the characteristic of the movable component includes an initial position of the movable component.

12. The apparatus of claim 1, wherein the characteristic of the movable component includes an initial orientation of the movable component.

13. The apparatus of claim 1, wherein:
the at least one propulsion device includes at least one motor-driven propeller;
the movable component includes a movable camera lens;
the first input includes:
 a weight of the camera lens; and
 an initial location of the camera lens;
the second input includes a target location for the camera lens;
at least one of the first input or the second input includes a target speed for moving the camera lens; and
the instructions, when executed, further cause the control system to:
 receive a further input corresponding to an initial attitude of the airframe;
 determine an estimated subsequent location of the camera lens, based on the initial location, the target location, and the target speed;
 determine an estimated change from the initial attitude of the airframe based at least in part on the estimated subsequent location of the camera lens and the weight of the camera lens; and
 in response to the first input and the second input, direct a change in a speed of the at least one motor-driven propeller to perform at least one of positioning the airframe in the initial attitude or maintaining the airframe in the initial attitude, before a movement of the camera lens in response to the command to move the movable component is sensed on board the airframe.

14. The apparatus of claim 1, wherein:
the second input is directed to an actuator coupled to the movable component, the actuator being configured to move the movable component in response to the second input; and
the instructions, when executed, further cause the control system to direct a change in a speed of at least one motor before movement of the movable component in response to the command is sensed on board the airframe.

15. The apparatus of claim 1, wherein the instructions, when executed, further cause the control system to:
receive a fourth input corresponding to an external force applied to the airframe, and direct the change in the setting of the at least one propulsion device further based at least in part on the fourth input.

16. The apparatus of claim 1, wherein the airframe has a pre-movement attitude prior to the control system receiving the second input, and wherein directing the change in the setting of the at least one propulsion device includes causing the airframe to maintain, move toward, or both maintain and move toward, the pre-movement attitude.

17. The apparatus of claim 16, wherein the pre-movement attitude includes an orientation of the airframe relative to at least one of a pitch axis, a roll axis, or a yaw axis of the airframe.

18. The apparatus of claim 16, wherein the pre-movement attitude includes an orientation of the airframe relative to a horizontal plane.

19. The apparatus of claim 1, wherein the movable component includes a payload.

* * * * *